United States Patent
Mauzizio et al.

(10) Patent No.: US 6,591,596 B2
(45) Date of Patent: Jul. 15, 2003

(54) FRONT CUTTING GRASS-CUTTING MACHINE WITH CENTRAL CONTAINER AND REAR UNLOADING SYSTEM

(75) Inventors: Negri Mauzizio, Gonzaga (IT); Zaccarelli Paolo, Correggio (IT)

(73) Assignee: Officine Bieffebi SRL, Gonzaga (IT)

( * ) Notice: Subject to any disclaimer, the term of this patent is extended or adjusted under 35 U.S.C. 154(b) by 0 days.

(21) Appl. No.: 09/820,681

(22) Filed: Mar. 30, 2001

(65) Prior Publication Data

US 2001/0025472 A1 Oct. 4, 2001

(30) Foreign Application Priority Data

Apr. 4, 2000 (IT) .......................... MI00A0721

(51) Int. Cl.[7] .............................................. A01D 34/71
(52) U.S. Cl. ............................ 56/16.6; 56/14.7; 56/203
(58) Field of Search .............................. 56/12.8, 12.9, 56/13.3, 14.7, 16.7, 16.8, 194, 195, 197, 202, 203, 205, 206

(56) References Cited

U.S. PATENT DOCUMENTS

| 4,984,420 | A | * | 1/1991 | Samejima et al. | ............ 56/203 |
| 5,473,871 | A | * | 12/1995 | Fava et al. | .................. 56/14.7 |
| 5,778,648 | A | * | 7/1998 | Parkes et al. | ................ 56/13.3 |
| 5,870,889 | A | * | 2/1999 | Togoshi et al. | ............... 56/13.3 |
| 6,052,973 | A | * | 4/2000 | Tsuchihashi et al. | .......... 56/249 |
| 6,082,086 | A | * | 7/2000 | Togoshi et al. | ............... 56/199 |
| 6,089,006 | A | * | 7/2000 | Langford et al. | ............. 56/13.3 |
| 6,148,595 | A | * | 11/2000 | Rabe et al. | ..................... 56/202 |
| 6,449,933 | B1 | * | 9/2002 | Umemoto et al. | ............ 56/13.3 |

FOREIGN PATENT DOCUMENTS

| EP | 0 619 065 B1 | | 7/1999 |
| FR | 2 746 253 | | 9/1997 |
| JP | 4-316423 | * | 11/1992 |
| JP | 5-15229 A | * | 1/1993 |
| JP | 5-56714 A | * | 3/1993 |
| JP | 5-76231 | * | 3/1993 |
| JP | 6-16 A | * | 1/1994 |
| JP | 6-90605 A | * | 4/1994 |
| JP | 6-225614 | * | 8/1994 |
| JP | 08 130967 | | 5/1996 |

* cited by examiner

Primary Examiner—Thomas B. Will
Assistant Examiner—Nathan Mammen
(74) Attorney, Agent, or Firm—Dykema Gossett PLLC

(57) ABSTRACT

Machine for cutting grass comprising a plate located in the front part of the machine, a storage container located between the axes of rotation of the front wheels and rear wheels of the machine and connected to the plate by a duct, the machine comprising a device for moving the container to cause the outward movement and overturning thereof so as to unload the cut grass in the longitudinal direction and toward the rear of the machine.

8 Claims, 2 Drawing Sheets

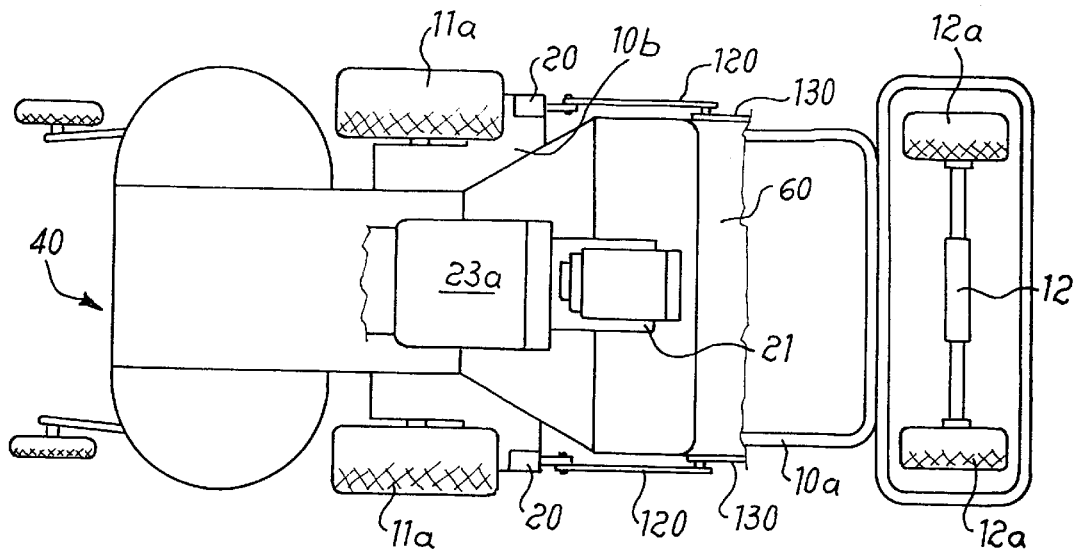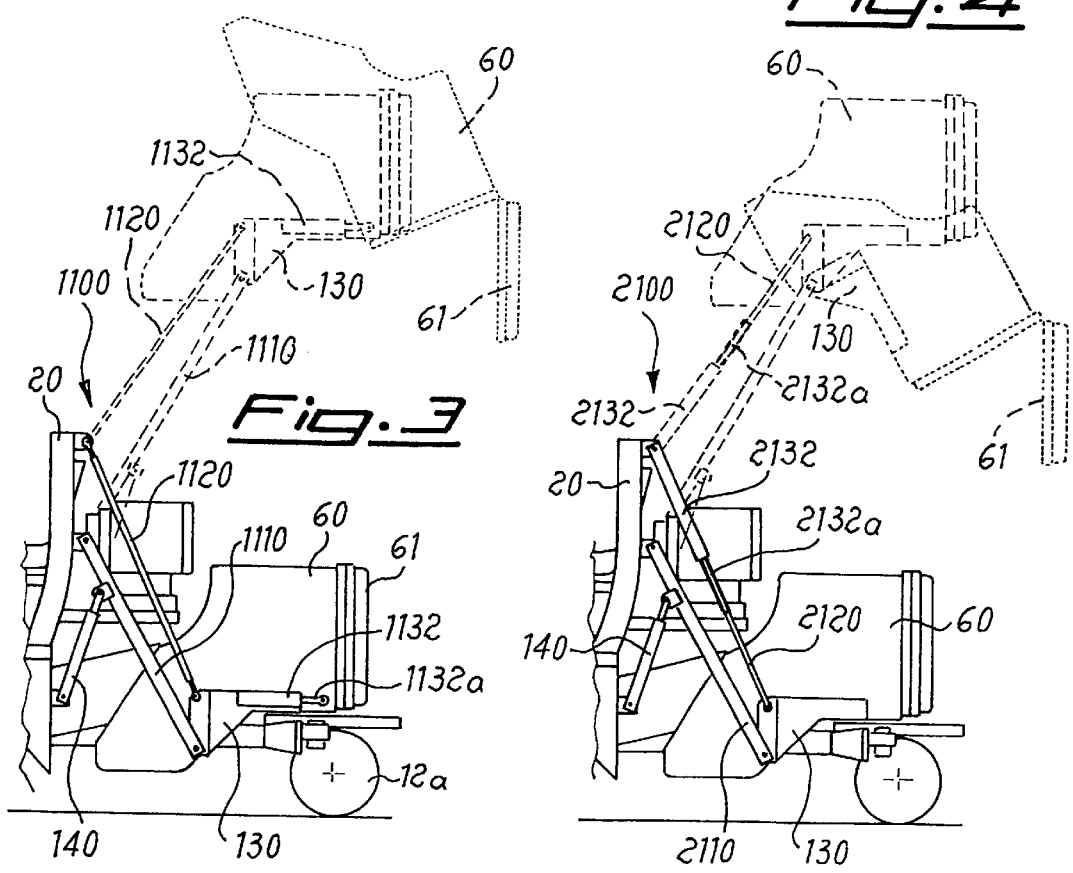

FRONT CUTTING GRASS-CUTTING MACHINE WITH CENTRAL CONTAINER AND REAR UNLOADING SYSTEM

BACKGROUND OF THE INVENTION

The present invention relates to a machine for cutting grass and the like, of the type comprising a grass-cutting plate situated in the front part of the machine, a storage container located between the axes of rotation of the front and rear wheels of the machine and means for moving the container designed to cause the outward movement thereof and overturning of the container so as to unload the cut grass in the longitudinal direction and towards the rear of the machine.

In the art numerous types of self-propelled means for cutting the grass of lawns, both large and small in size, are known. In particular European patent No. 0,619,065 in the name of the same applicant discloses a grass-cutting machine, comprising means for steering the machine, a grass-cutting plate comprising at least one pair of propellers made to rotate by associated power transmission means operated by the motor, a part for protecting said propellers and a duct extending from the protection part towards the container for storing the cut grass, in which the action of pushing the cut grass towards the said container is performed by the pressure generated by the propellers; said machine is characterized in that the grass-cutting plate is situated in the front part of the machine, the duct extends towards the central part of the machine and the storage container is located between the axes of rotation of the front wheels and rear wheels of the machine.

In this machine unloading of the container with the cut grass is performed by extracting the container laterally in a projecting manner and overturning it for emptying thereof, thus limiting the use of the machine to small-size lawns, since it is not possible to increase the volume of the container both for space-related reasons and so as not to produce an excess load which would cause tipping over during unloading.

Machines especially designed for large-area lawns are also known, said machines being equipped with a container for the cut grass having a volume which is much larger, with unloading thereof being performed in the longitudinal direction from the rear of the machine.

On account of the dimensions of the container, the machines, however, have the bin arranged in an upper position with respect to the axes of the wheels, resulting in the need to use auxiliary turbines in order to push the cut grass inside the said container; on the other hand, the container may be arranged lower down, but at the rear of the machine, resulting in an increase in the dimensions of the latter and the need to arrange the grass-cutting plate in a position between the axes of the wheels, with the disadvantages of the machines of this type which do not allow visual monitoring of the cutting direction as in front-cutting machines.

The technical problem which is posed, therefore, is that of providing a grass-cutting machine which, while retaining the advantages of front-cutting machines with a central storage container, allows the possibility of having a large volume of the container and performing unloading of the latter in the longitudinal direction and towards the rear of the said machine.

Within the scope of this problem, a further requirement is that the container should be able to be unloaded both at a small height from the ground and at a large height from the ground so as to be able to perform said unloading directly into the body of a lorry or a trailer for transportation of the cut grass.

SUMMARY OF THE INVENTION

These technical problems are solved according to the present invention by a machine for cutting grass and the like, of the type comprising a grass-cutting plate situated in the front part of the machine, a storage container located between the axes of rotation of the front and rear wheels of the machine and connected to the said plate by means of an associated duct, said machine being provided with means for moving the container designed to cause the outward movement and overturning of the container so as to unload the cut grass in the longitudinal direction and towards the rear of the machine.

BRIEF DESCRIPTION OF THE DRAWINGS

Further details may be obtained from the following description of a non-limiting example of embodiment of the invention, provided with reference to the accompanying plates of drawings, in which:

FIG. 2 shows a top plan view of the machine shown in FIG. 1;

FIG. 3 shows a side view of the machine, illustrating a first variation of embodiment of the container actuating means; and FIG. 4 shows a side view of the machine, illustrating a second variation of embodiment of the container actuating means.

DETAILED DESCRIPTION OF THE INVENTION

Figure 1:
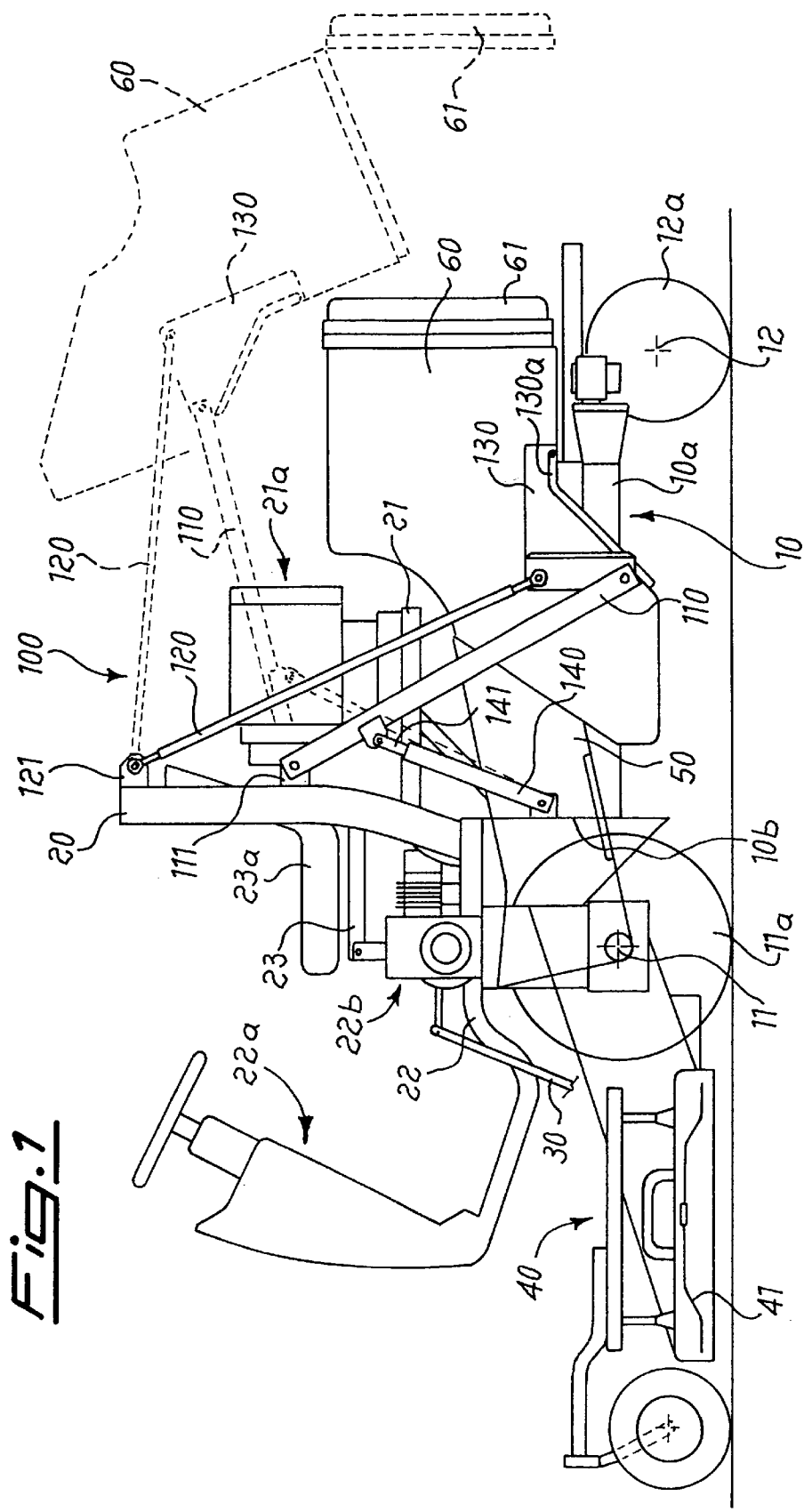
FIG. 1 shows a schematic side view of the grass-cutting machine according to the present invention.

As shown, the machine according to the invention comprises a frame 10 comprising a quadrangular bar 10a arranged along a horizontal plane and a framework 10b which is formed by welded metal plates and is joined to the bar 10a in a front position relative to the direction of travel of the machine.

The rear axle 12 and front axle 11 of the wheels 12a, 11a are respectively joined to the bar 10a and to the framework 10b.

The framework 10b supports: a rear platform 21 on which the motor 21a is situated; a front platform 23 supporting the seat 23a; a front footboard 22 which supports the transmission 22a of the steering and the hydrostatic motor 22b for steering the wheels, arranged underneath the seat 23a.

The motor 21a has, connected to it, the transmission 30 (only schematically shown in FIG. 1) for actuating the propellers 41 contained in the grass-cutting plate 40 with which a first end of the manifold 50 is engaged, the other end being engaged with the container 60 for storing the cut grass.

As shown, the container 60 is suitably shaped so as to be able to be contained in a position located between the axes 11, 12 of the wheels, thereby enabling the longitudinal dimensions of the machine to be kept to a minimum and ensuring that the mouth for connection to the manifold 50 is in a position slightly raised from the ground, which allows the sole pressure produced by rotation of the blades 41 to be used in order to convey the grass to the storage container, without the need for auxiliary turbines.

Two uprights 20 which form the elements for securing the device 100 for moving the container 60 in order to empty it are also fastened to the longitudinal sides of the framework 10b.

In greater detail, said device 100 comprises two pairs of levers 110 and 120, which extend in a substantially longitudinal direction and are arranged laterally on opposite sides of the container 60 and the opposite ends of which are respectively hinged with corresponding flanges 111, 121 integral with the said uprights 20 and with respective plates 130 fastened to the side surfaces of the container 60.

Said plates are connected together in the transverse direction by a plate 130a arranged underneath the container 60.

Each lever 110 also has, hinged therewith, the free end of the stem 141 of a cylinder 140 which is in turn hinged with the framework 10b.

The operating principle of the machine is as follows:

firstly the machine is started up and mowing of the lawn is performed until the container 60 is completely filled;

the machine is then brought into the vicinity of the unloading point and the cylinders 140 are actuated, said cylinders pushing the levers 110 by means of the associated stem 141 and causing rotation thereof upwards;

this rotation causes the consequent pivoting movement of the container 60, due to the combined action of the levers 110, 120 on the plates 130;

said pivoting of the container 60 ensures that: during a first step the said container moves out upwards and towards the rear of the machine so as to be disengaged from the platform 21 and from the frame 10; during a second step, with continued rotation of the levers 110 and 120, partial overturning of the container is produced, thereby causing opening of the flap 61 and unloading of the cut grass.

As shown in FIGS. 3 and 4, it is envisaged that unloading of the container 60 may also be performed in a higher position so as to allow emptying of the grass onto trailers of lorries or the like.

Alternatively it is envisaged that raising to a higher level may performed by also designing the levers 110 and 120 according to the example of FIG. 1 with suitable dimensions.

In greater detail (FIG. 3) the devices 1100 for actuating the container comprise a pair of levers 1110 and 1120 which are similar to those 110, 120 of the preceding example and designed with suitable dimensions to allow adequate raising of the said container by means of the cylinder 140, overturning thereof being produced by the action of a second cylinder 1132 which is joined to the plate 130 of the container 60 and the stem 1132a of which is hinged with the side of the said container.

In the example according to FIG. 4, the devices 2100 for actuating the container 60 comprise a lever 2110 similar to the preceding lever 110 and therefore not described in detail and a second lever 2120, the end of which opposite to that joined to the plate 130 is fastened to the stem 2132a of a second cylinder 2132 arranged coaxially with the said lever 2120 and hinged with the upright 20.

Once raising of the container by means of the cylinder 140 has been completed (or at the same time as raising thereof), it is possible to operate the second cylinder 2132 so as to cause the outward movement of the stem 2132a and the consequent overturning of the container 60 shown in broken lines.

What is claimed is:

1. Machine for cutting grass, of the type comprising a frame having, mounted thereon, an actuating motor, a driving seat, means for steering the machine, a grass-cutting plate comprising at least one propeller made to rotate by associated power transmission means, and a central duct extending between the grass-cutting plate and a mouth of a container at a lower front end thereof for conveying the grass to the container solely by pressure produced by rotation of the propeller, the grass-cutting plate being situated in a front part of the machine and the container being mounted within the frame and located between the axes of rotation of the front wheels and rear wheels of the machine without overhanging a rearward end of the machine, comprising means for moving the container, said means being designed to cause outward movement and overturning of the container so as to unload the cut grass in longitudinal direction and toward the rear of the machine, wherein said frame comprises at least one quadrangular bar arranged in a horizontal plane and located between the axes of the wheels of the machine.

2. Machine according to claim 1, wherein said container is designed to be partially contained inside said quadrangular bar.

3. Machine according to claim 1, wherein two uprights which form the elements for securing the means for moving the container are fastened to longitudinal sides of the frame.

4. Machine according to claim 3, wherein said means for moving the container comprise two pairs of levers which extend in a substantially longitudinal direction and the opposite ends of which are respectively hinged with said uprights and with respective plates fastened to the side surfaces of the container as well as at least one element for actuating said levers.

5. Machine according to claim 4, wherein said actuating element comprises a cylinder located between at least one lever of each pair and the fixed frame.

6. Machine according to claim 4, wherein said movement means comprise a second cylinder.

7. Machine according to claim 6, wherein said second cylinder is located between at least one of the side plates of the container and the container itself.

8. Machine according to claim 6, wherein said second cylinder is located in the longitudinal direction between one end of one of the two movement levers and a fixed part of the machine.

* * * * *